United States Patent [19]

Hirayama et al.

[11] Patent Number: 5,848,041

[45] Date of Patent: Dec. 8, 1998

[54] METHOD AND APPARATUS FOR RECORDING DIGITAL SIGNALS MEDIUM FOR RECORDING DIGITAL SIGNALS AND METHOD

[75] Inventors: Koichi Hirayama, Yokohama; Hiroharu Satoh, Tokyo, both of Japan

[73] Assignee: Kabushiki Kaisha Toshiba, Kawasaki, Japan

[21] Appl. No.: 870,733

[22] Filed: Jun. 6, 1997

Related U.S. Application Data

[63] Continuation of Ser. No. 608,513, Feb. 28, 1996, Pat. No. 5,719,842.

[30]   Foreign Application Priority Data

Feb. 28, 1995 [JP] Japan ................................. 7-040457

[51] Int. Cl.$^6$ ............................................................. G11B 7/00
[52] U.S. Cl. ................................................................. 369/59
[58] Field of Search ................................. 369/124, 59, 48, 369/47, 275.3; 360/65, 46

[56]   References Cited

U.S. PATENT DOCUMENTS 4,121,263  10/1978  Price ........................................ 360/122
4,288,823   9/1981  Yamamoto et al. ................... 360/72.2
4,312,020   1/1982  Hasegawa ................................ 360/65
4,352,130   9/1982  Hasegawa et al. ...................... 360/65
4,353,100  10/1982  Inoue ....................................... 360/65
4,965,873  10/1990  White ...................................... 360/41
5,166,914  11/1992  Shimada et al. ........................ 369/32
5,347,408   9/1994  Gohda et al. ........................... 360/65
5,488,591   1/1996  Kobayashi et al. ..................... 369/47
5,519,676   5/1996  Kitahara .
5,644,307   7/1997  Fukuda .................................... 341/68

*Primary Examiner*—Nabil Hindi
*Attorney, Agent, or Firm*—Cushman Darby & Cushman IP Group of Pillsbury Madison & Sutro LLP

[57]   ABSTRACT

An excellent waveform signal with less jitter is obtained as an output signal from a reproducing optical pickup, irrespective of a relative reading speed. Thus there is no need for an equalizing circuit on a reproducing apparatus side. An input bit sequence or a recording NRZI signal is combined with spatial frequency characteristics G(fs) by a G(fs) converter. An output signal from the G(fs) converter is combined with equalizing frequency characteristics EQ(fs) necessary on a reproducing side by an EQ(fs) converter. An output from the EQ(fs) converter is saturation-amplified by a saturation amplifier, thereby producing an ideally pre-jittered recording signal that has equivalent enhanced high-frequency component. The recording signal is recorded on an optical disk.

8 Claims, 13 Drawing Sheets

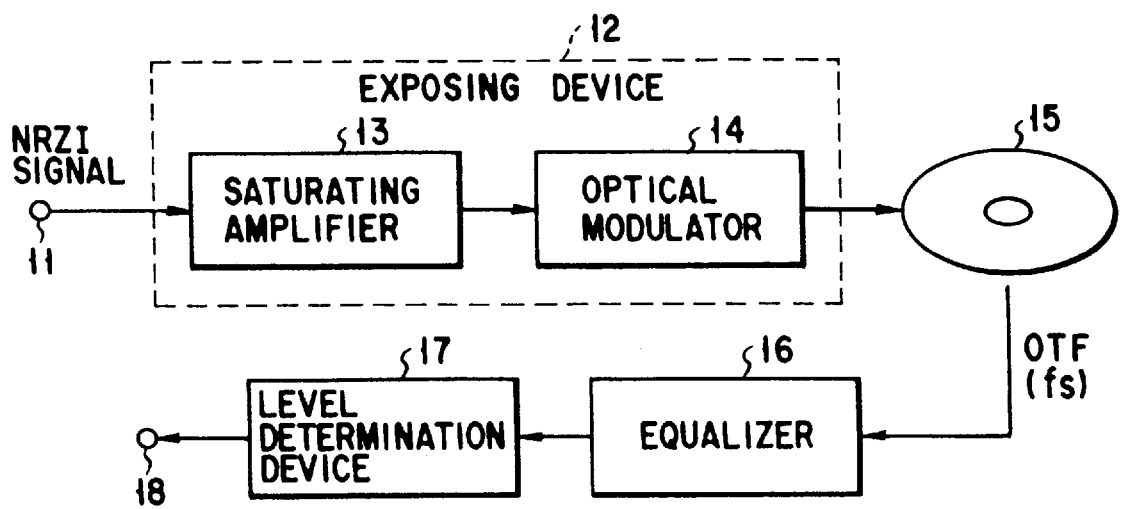
F I G. 1

METHOD AND APPARATUS FOR RECORDING DIGITAL SIGNALS MEDIUM FOR RECORDING DIGITAL SIGNALS AND METHOD

This is a continuation of application Ser. No. 08/608,513, filed Feb. 28, 1996 now U.S. Pat. No. 5,719,842.

BACKGROUND OF THE INVENTION

1. Field of the Invention

The present invention relates to a method and an apparatus for recording digital signals, which are effectively adopted, for example, in recording equipment for recording digital data on an optical disk, and to a method and an apparatus for transmitting digital signals.

2. Description of the Related Art

Optical disks include, for example, a digital audio disk on which audio signals are recorded, and a digital video disk on which audio signals and video signals are recorded. A reproducing apparatus for reproducing the optical disk includes a rotary servo unit for rotating the optical disk, and an optical pickup for reading a recorded signal by radiating a laser beam on a recording surface of the disk and detecting the reflected beam.

A modulation signal output from the optical pickup is first input to an equalizing circuit and equalized in waveform. The waveform-equalized signal is then guided to a demodulation circuit.

As mentioned above, the disk reproducing apparatus generally includes an equalizing circuit for equalizing a picked-up signal. The equalizing circuit, however, is expensive and does not necessarily have excellent equalizing characteristics. It has a possibility that the characteristics deteriorate with the passing of time.

SUMMARY OF THE INVENTION

An object of the present invention is to provide a method and apparatus for recording a digital signal and a recording medium for recording a digital signal, wherein an equalizing circuit is dispensed with on a reproducing apparatus side.

Another object of the invention is to provide a method and apparatus for recording a digital signal and a recording medium for recording a digital signal, wherein an excellent waveform signal with less jitter is obtained as an output signal from a reproducing optical pickup, irrespective of a relative reading speed, and an equalizing circuit is dispensed with on a reproducing apparatus side.

Still another object of the invention is to provide a method and apparatus for transmitting a digital signal, wherein excellent characteristics of a demodulated output of a digitally transmitted signal can be obtained.

In order to achieve the above objects, a method of recording or transmitting a digital signal is provided, wherein a first signal is provided with predetermined frequency characteristics, thereby obtaining a second signal, the second signal is provided with reproduction-side or reception-side equalizing characteristics, thereby obtaining a third signal, the third signal is saturation-amplified, thereby obtaining a fourth digital signal sequence, and the fourth digital signal sequence is recorded or transmitted.

In order to achieve the above objects, an apparatus for recording or transmitting a digital signal is provided, comprising:

means for providing a first signal with predetermined frequency characteristics, thereby obtaining a second signal;

means for providing the second signal with reproduction-side or reception-side equalizing characteristics, thereby obtaining a third signal;

means for saturation-amplifying the third signal, thereby obtaining a fourth digital signal sequence; and means for recording or transmitting the fourth digital signal sequence.

In addition, in order to achieve the above objects, there is provided a method of recording or transmitting a digital signal, the method comprising:

a first step of providing an input bit sequence, which has a bit interval Pw and an interval of n×Pw to m×Pw (n<m; n and m=integers) of transition points between bit 0 and bit 1, with predetermined frequency characteristics, thereby obtaining a first signal retaining information of the interval of the bit transition points;

a second step of providing the first signal with equalizing characteristics of an output signal from a reproducing pickup (or a high-frequency reception unit), thereby producing a second signal; and a third step of saturation-amplifying the second signal and converting the saturation-amplified signal to a bit sequence.

Furthermore, in order to achieve the above objects, there is provided an apparatus for recording or transmitting a digital signal, comprising:

first conversion means for providing an input bit sequence, which has a bit interval Pw and an interval of n×Pw to m×Pw (n<m; n and m=integers) of transition points between bit 0 and bit 1, with predetermined frequency characteristics, thereby obtaining a first signal retaining information of the interval of the bit transition points;

second conversion means for providing the first signal output from the first conversion means with equalizing characteristics of an output signal from a reproducing pickup (or a high-frequency reception unit), thereby producing a second signal; and third conversion means for saturation-amplifying the second signal output from the second conversion means and converting the saturation-amplified signal to a bit sequence.

If the present invention is applied to an apparatus for recording a signal on a disk, the frequency characteristics of a recording pit sequence on the disk are equalized and provided with predetermined ultimate spectral characteristics of a reproduced signal and compensation characteristics for preventing degradation of a reproduced signal due to frequency characteristics of a reproducing system. In this case, a recording signal is recorded at a saturated level. Specifically, the recording signal is provided with ideal equalized jitter. As a result, when the recording signal is reproduced by a reproducing apparatus, an excellent reproduced signal with less jitter can be obtained without using an expensive, complex equalizing circuit. The same applies to a transmission system, and a reception signal with an excellent waveform can be obtained.

Additional objects and advantages of the invention will be set forth in the description which follows, and in part will be understood from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 schematically shows a disk recording/reproducing system on which the present invention is based.

DETAILED DESCRIPTION OF THE PREFERRED EMBODIMENTS

Figure 2:
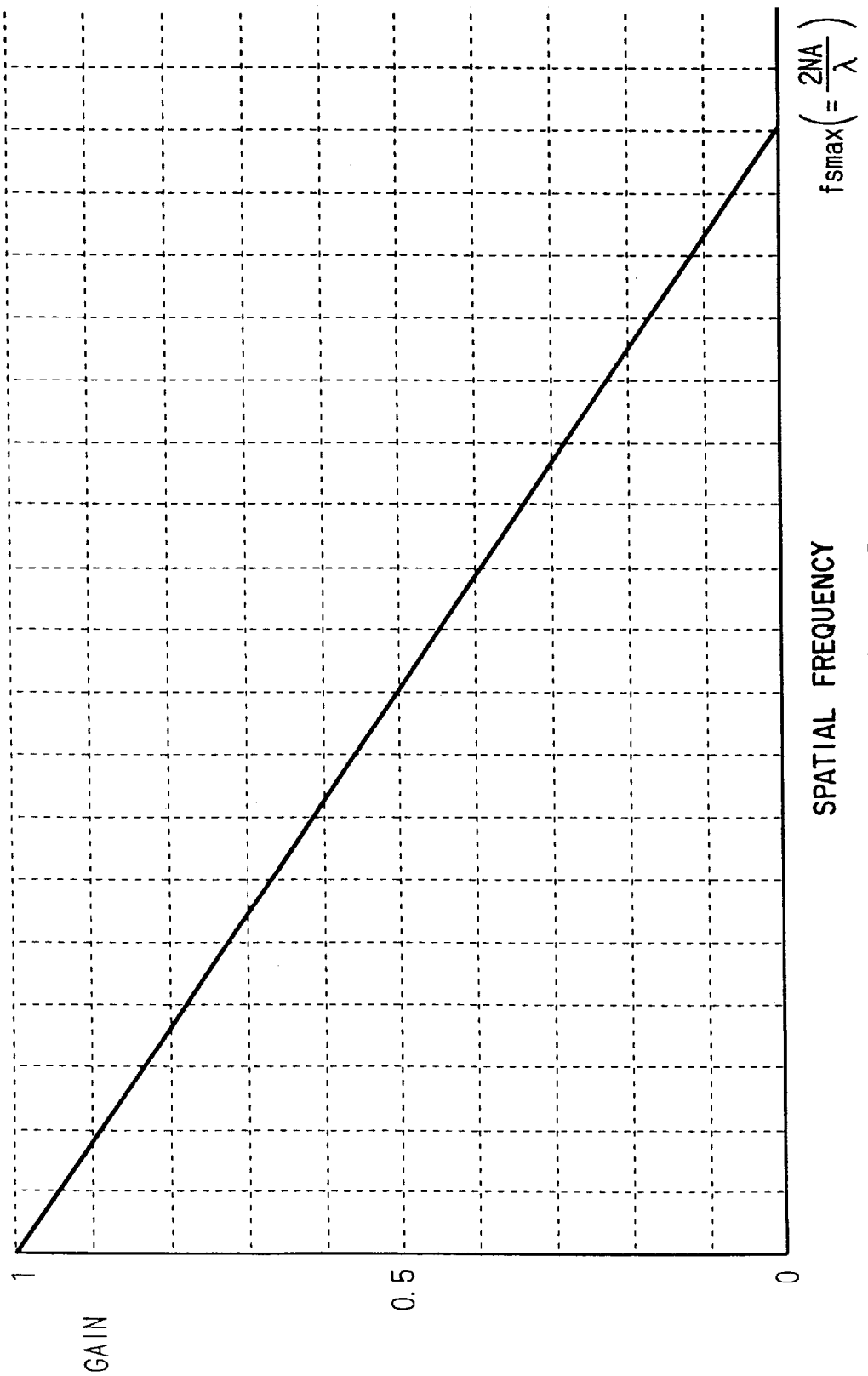
FIG. 2 shows spatial frequency characteristics of an optical pickup.

Embodiments of the present invention will now be described with reference to the accompanying drawings.

At first, a premise technique, on which the present invention is based, will be described with reference to FIGS. 1 to 6. FIG. 1 shows a disk recording/reproducing system.

A modulated signal to be recorded is supplied to an input terminal 11. The modulated signal is an NRZI (non-return to zero interleave) signal which is obtained by modulating a digital signal. The NRZI signal is input to a saturating amplifier 13 of an exposing device 12 and amplified at a saturated level to a binary signal. The binary signal output from the saturating amplifier 13 is input to an optical modulator 14 and optically converted to a laser beam. Thus, the converted laser beam is radiated on a recording surface of an optical disk 15. The optical disk 15 is an information recordable optical disk of a phase-variation type or a magnetic optical variation type.

Record information recorded on the optical disk 15 is read by a pickup (not shown) in which a laser is employed. A read signal output from the pickup is waveform-equalized by a reproducing equalizer 16. An output of the equalizer 16 is input to a level determination device 17 and compared with a slice level and then led to an output terminal 18 as a binary signal.

Suppose that ideal single-cycle rectangular bits with no jitter are recorded on the optical disk 15. In this case, the maximum readable spatial frequency which can be correctly read by the pickup with a laser wavelength $\lambda$ and a numerical aperture NA of an objective lens is given by $$fsmax = 2NA/\lambda$$

FIG. 2 shows reading characteristics of the optical pickup at each spatial frequency, which depend on spatial transmission frequency characteristics OTF(fs) being present in the optical system. Because of these characteristics, the reading characteristics of the optical pickup at each spatial frequency are defined such that the amplitude of the reproduction signal decreases linearly from low spatial frequencies towards the highest spatial frequency at a constant group delay.

If the relative reading speed between the optical disk 15 and optical pickup is V, the frequency characteristics of the signal output from the optical pickup is expressed by V×OTF(fs).

The maximum reproduction frequency fmax is expressed by $$fmax = V \times fsmax = V \times (2NA/\lambda)$$

For example, when $\lambda = 635$ nm and NA=0.6, $$fsmax = 2NA/\lambda$$

Thus, the maximum readable spatial frequency is fsmax=1890 [number/mm]. The recording cycle of a readable rectangular pit sequence is 529 nm.

In this case, the maximum reproduction output is obtainable when the duty is 50%, i.e. both the length of the rectangular pit and the length of the non-pit portion are 265 nm.

In addition, the maximum reproduction frequency fmax output when V=3.6 m/s is given by $$fmax = 6.8 \text{ MHz}$$

Figure 3:
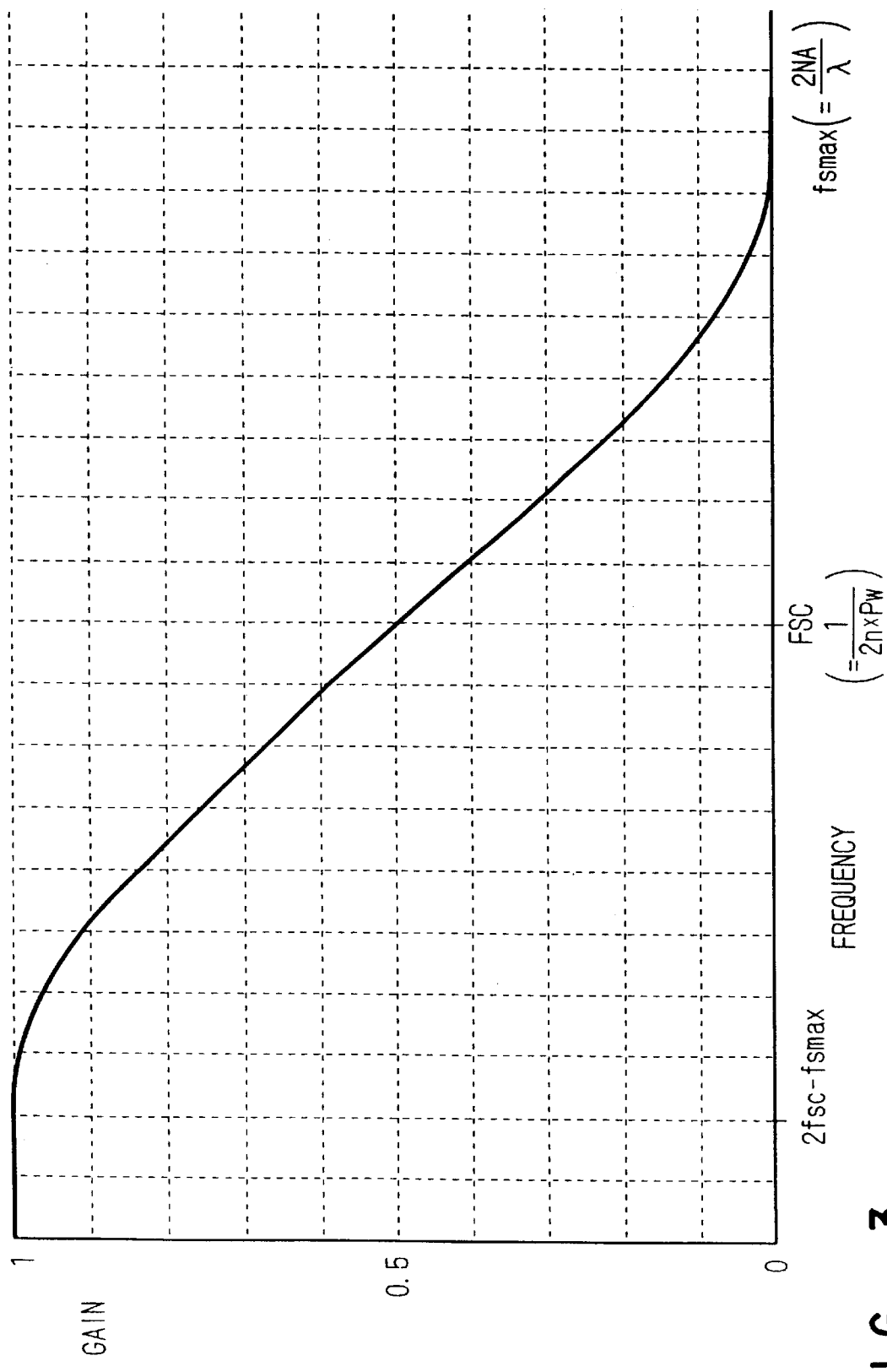
FIG. 3 shows ideal spatial frequency characteristics of an optical pickup.

Suppose that a rectangular pit sequence with no single cycle is recorded on the optical disk, both the length of the pit and the length of the non-pit portion are an integer number of times of Pw (a minimum bit interval between adjacent bits), and both the minimum pit length and the minimum non-pit length are n×Pw (i.e. the length of continuous "0"s or "1"s). In this case, the ideal spatial frequency characteristics G(fs), with which zero-cross points of a reproduced signal are exactly located at an interval of m×Pw (m>n), are, as shown in FIG. 3, given by $$G(fs) = 1$$

(when $fs \leq (1-k)fsc$)

$$G(fs)=(1/2)+(1/2)\cos[(\pi/2)+(\pi/4)\times\{(fs-fsc)/(k\times fsc)\}]$$

$$\{\text{when }(1-k)fsc<fs<(1+k)fsc\}$$

$$G(fs)=0$$

(when $fs \geq (1+k)fsc$)
In the above, $$fsc=1/(2n\times Pw)$$

$$k=(fsmax/fsc)-1$$

(when $fsc<fsmax<2fsc$)

$$k=1$$

(when $fsmax \geq 2fsc$)

The above ideal spatial frequency characteristics G(fs) are called (k×100)% cosine roll-off characteristics with a cut-off frequency of fsc=1/(2n×Pw).

Accordingly, spatial equalizing frequency characteristics EQ(fs) necessary for spatial transmission frequency characteristics OTF(fs) of the optical pickup which is an optical system are given by $$EQ(fs)=G(fs)/OTF(fs) \qquad (1)$$

Figure 4:
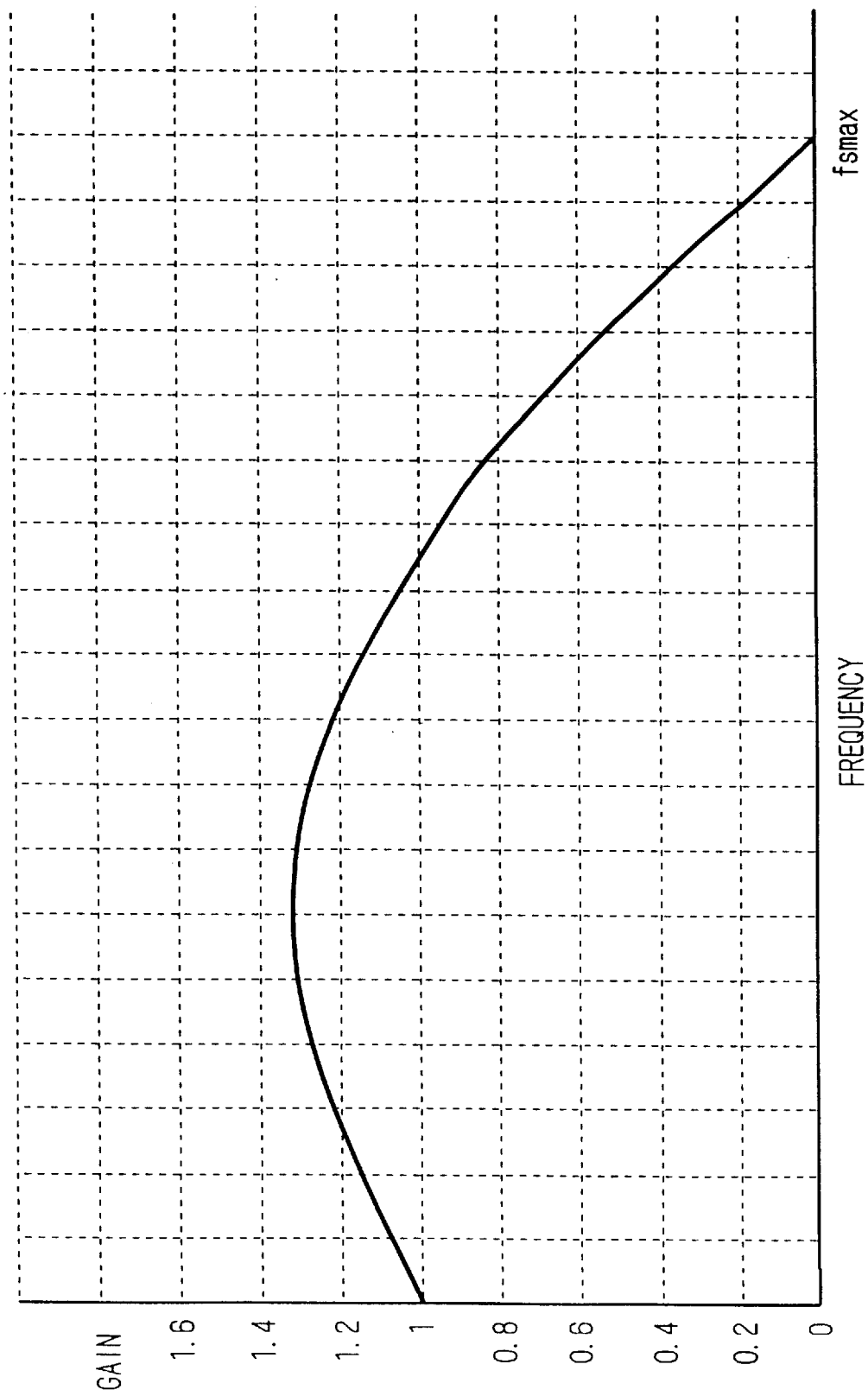
FIG. 4 shows typical equalizing frequency characteristics.

FIG. 4 shows typical characteristics given by equation (1). Now refer back to FIG. 1.

The equalizer 16 needs to have the above-mentioned spatial equalizing frequency characteristics EQ(fs). Besides, the relative reading speed V between the optical disk and optical pickup is related, the characteristics of V×EQ(fs) are actually needed. That is, the characteristics give by the following equation are needed:

$$V\times EQ(fs)=V\times[G(fs)/OTF(fs)] \qquad (2)$$

Specifically, the reproducing equalizer 16 equalizes the reproduction signal reproduced by the optical pickup by using equation (2) of equalizing frequency characteristics in which the factor of relative reading speed V is added to the characteristics of equation (1).

This means that the spatial equalizing frequency characteristics EQ(fs) of the equalizer 16 shown in FIG. 4 are varied according to the relative reading speed V.

Figure 5:
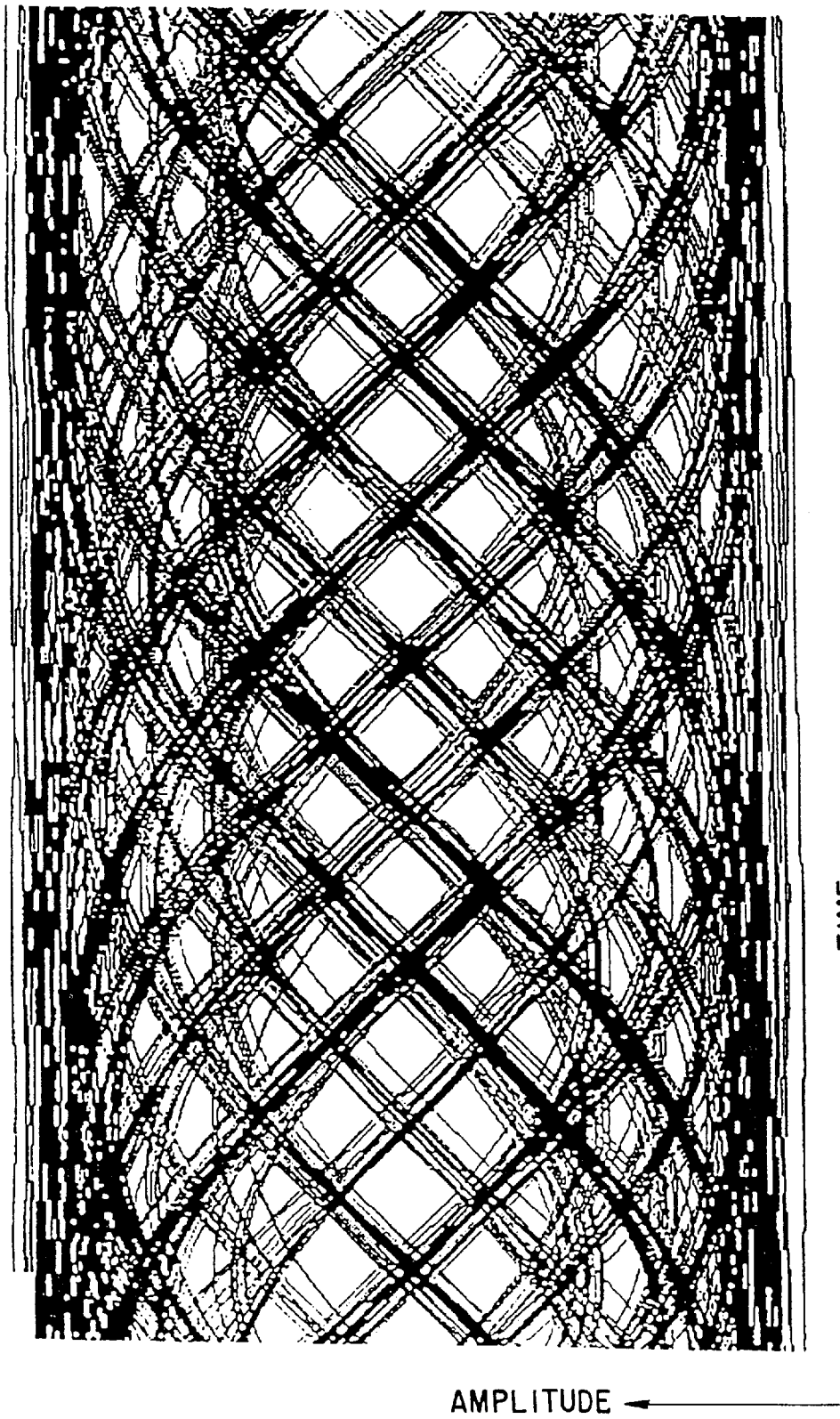
FIG. 5 shows eye pattern characteristics of recorded signals on an optical disk shown in FIG. 1, which have been read by the pickup and have not been equalized.
Figure 6:
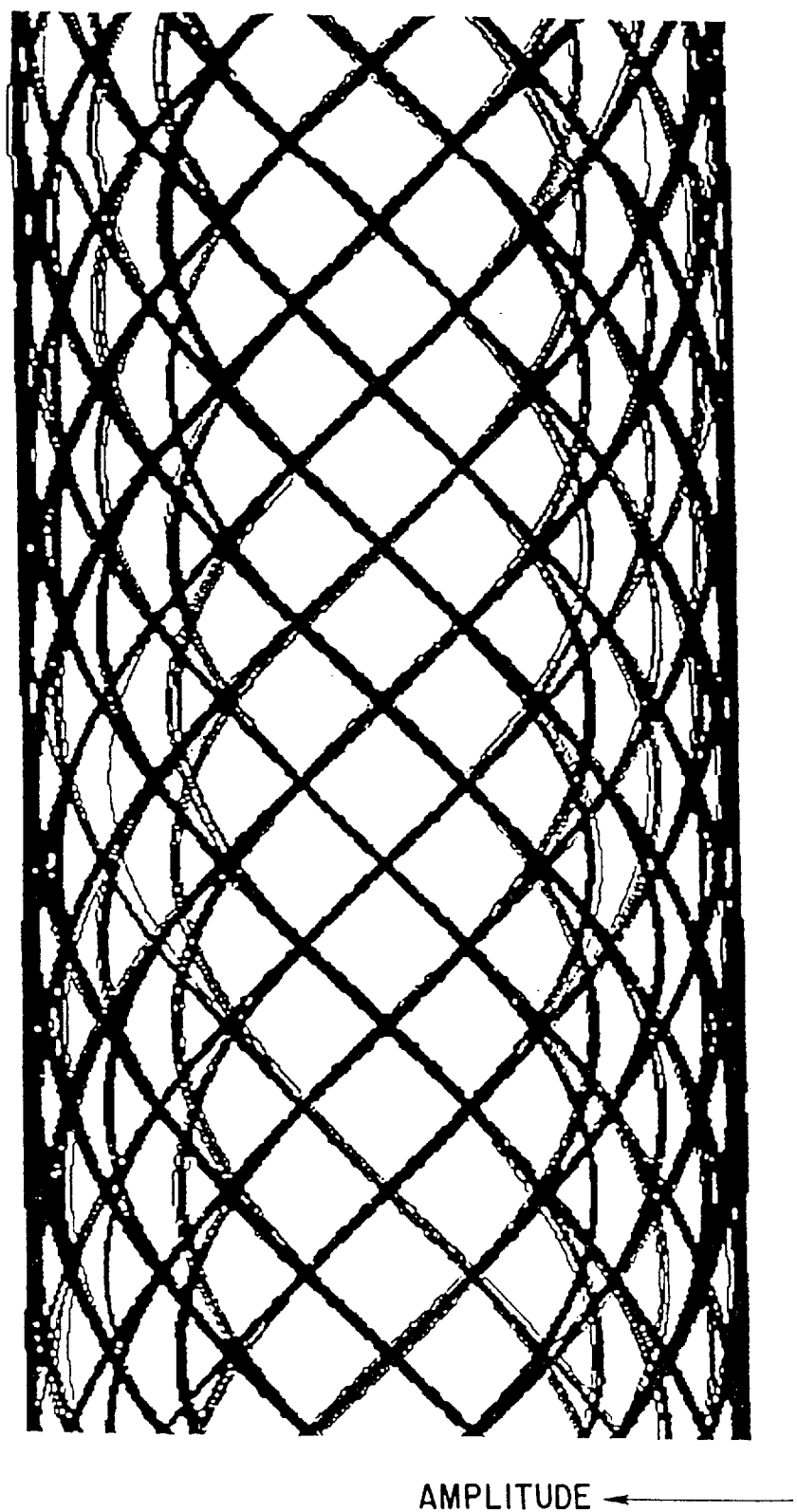
FIG. 6 shows eye pattern characteristics of recorded signals on an optical disk shown in FIG. 1, which have been read by the pickup and equalized.

FIG. 5 shows eye pattern characteristics of output signals in the case where reproduction signals reproduced by the optical pickup have not been equalized, and FIG. 6 shows eye pattern characteristics of output signals in the case where reproduction signals are reproduced by the optical pickup and equalized. In FIGS. 5 and 6, the ordinate indicates amplitude and the abscissa indicates time.

In the reproducing system, the spatial transmission frequency characteristics OTF(fs) of the optical pickup and the relative reading speed V are added as factors. Thus, the frequency characteristics of the output signals in the case where the reproduction signals are not equalized, as shown in FIG. 5, are expressed by V×OTF(fs).

On the other hand, the frequency characteristics of the output signals in the case where the reproduction signals are equalized, as shown in FIG. 6, are expressed by $$[V\times EQ(fs)]\times OTF(fs) \qquad (3)$$

where $EQ(fs) \neq 1$.

From equation (1), OTF(fs)=G(fs)/EQ(fs). Thus, equation (3) is expressed by $$[V\times EQ(fs)]\times[G(fs)/EQ(fs)]=V\times G(fs)$$

Accordingly, the frequency characteristics of the equalized output signals are close to the ideal spatial frequency characteristics to which the relative reading speed V has been added. The whole characteristics of this system vary according to the relative reading speed V.

In order to obtain the frequency characteristics closest to the ideal values at all times, the equalizing frequency characteristics of the equalizer must be varied according to the relative reading speed V.

On the other hand, with respect to the relative reading speed V, the radio of the reproduction speed to the recording speed is not always 1:1. Depending on the type of reproducing apparatus or reproduction mode, the ratio of the reproduction speed to the recording speed may be 1:4.

In the above system, an equalizer capable of varying equalizing frequency characteristics according to the relative reading speed V is needed. However, if the equalizing frequency characteristics of the equalizer are to be varied according to the relative reading speed V, the cost of the equalizer would rise. Furthermore, excellent equalizing characteristics are not necessarily be ensured. The characteristics may vary with the passing of time.

The object of the present invention is to provide a recording/equalizing apparatus and a recording/equalizing method, as well as a disk recording apparatus and a disk recording method, which are capable of obtaining an excellent signal waveform with less jitter as an output signal of a reproducing pickup, irrespective of a relative reading speed, thereby dispensing with an equalizing circuit on a reproducing apparatus side.

Specific embodiments of the present invention will now be described.

Figure 7:
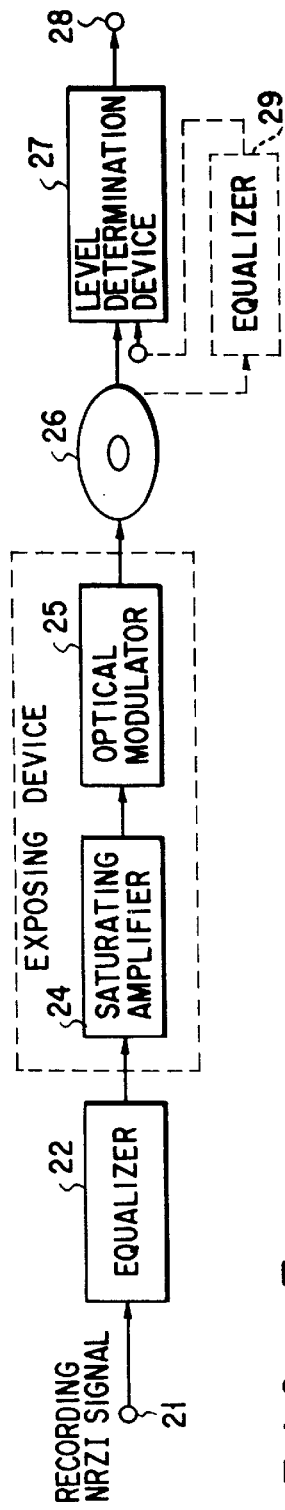
FIG. 7 shows the structure of a disk recording/reproducing system including a recording/equalizing circuit according to an embodiment of the present invention.

FIG. 7 shows the structure of a disk recording/reproducing system including a recording equalizer according to an embodiment of the invention.

A modulated signal to be recorded is supplied to an input terminal 21. The modulated signal is an NRZI (non-return to zero interleave) signal which is obtained by modulating a digital signal. For example, the NRZI signal is modulated by an 8–16 modulating system. The NRZI signal is an input bit sequence having a bit interval Pw and an interval of n×Pw to m×Pw (n<m; n and m=integers) of transition points between bit 0 and bit 1. In this case, n=3 and m=11.

The NRZI signal is input to a recording equalizer 22 constituting a main part of this embodiment. The recording equalizer 22 will be described later. A modulation signal output from the recording equalizer 22 is intentionally provided with jitter.

The modulation signal with the jitter is input to a saturating amplifier 24 of an exposing device 23 and amplified at a saturated level to a binary signal. The binary signal output from the saturating amplifier 24 is input to an optical modulator 25 and optically converted to a laser beam. Thus, the converted laser beam is radiated on a recording surface of an optical disk 26. The optical disk 26 is an information recordable optical disk of a pit forming type, a phase-variation type or a magnetic optical variation type.

Record information recorded on the optical disk 26 is read by a pickup (not shown) in which a laser is employed. A read signal output from the pickup is delivered to a level determination device 27 and compared with a slice level and then led to an output terminal 28 as a binary signal.

The recording equalizer 22 will now be described.

Figure 8:
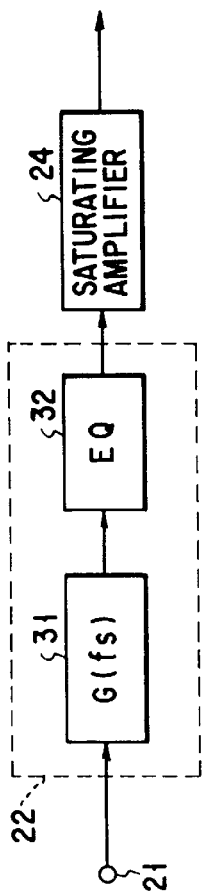
FIG. 8 shows the basic structure of an equalizer 22 shown in FIG. 7.

FIG. 8 is a block diagram showing an internal structure of the recording equalizer 22. As shown in FIG. 8, the recording equalizer 22 mainly comprises a G(fs) converter 31 for providing ideal spatial frequency characteristics G(fs) to an input bit sequence of the recording NRZI signal, and an EQ(fs) converter 32 for adding equalizing frequency characteristics of EQ(fs) of equation (1) to an output signal from the G(fs) converter 31, thereby producing a recording equalizing signal.

Figure 9:
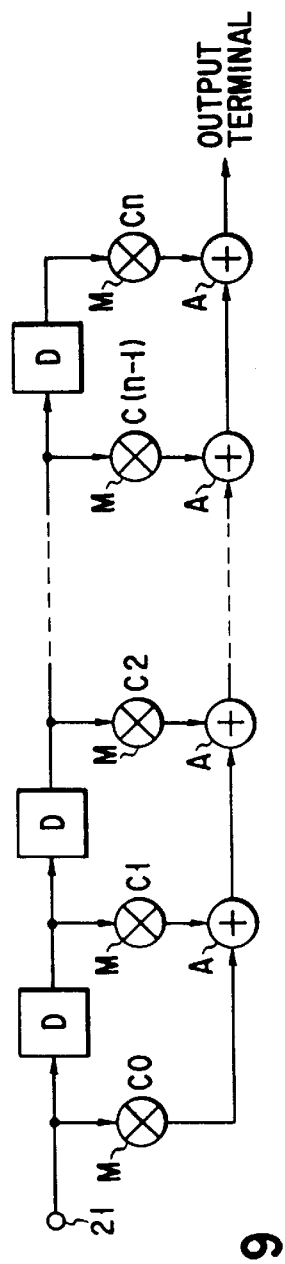
FIG. 9 shows a specific example of the structure of the equalizer 22 shown in FIG. 7.

FIG. 9 shows a specific hardware configuration of the recording equalizer 22.

The recording equalizer 22 comprises a series of delay devices, multipliers for multiplying inputs and outputs of the delay devices by predetermined coefficients $c_0, c_1, \ldots, c_n$, and adders for successively adding multiplied results of the respective multipliers. Specifically, a plurality of delay devices D are connected in series to the input terminal 21. The signal from the input terminal 21 and output signals from the delay devices D are multiplied by coefficients $c_0$ through $c_n$ in the multipliers M. The outputs from the multipliers M are added by the adders A and led to the output terminal.

The operation of the recording equalizer 22 will now be described with reference to signal waveforms illustrated in FIGS. 10 to 14.

Figure 10:
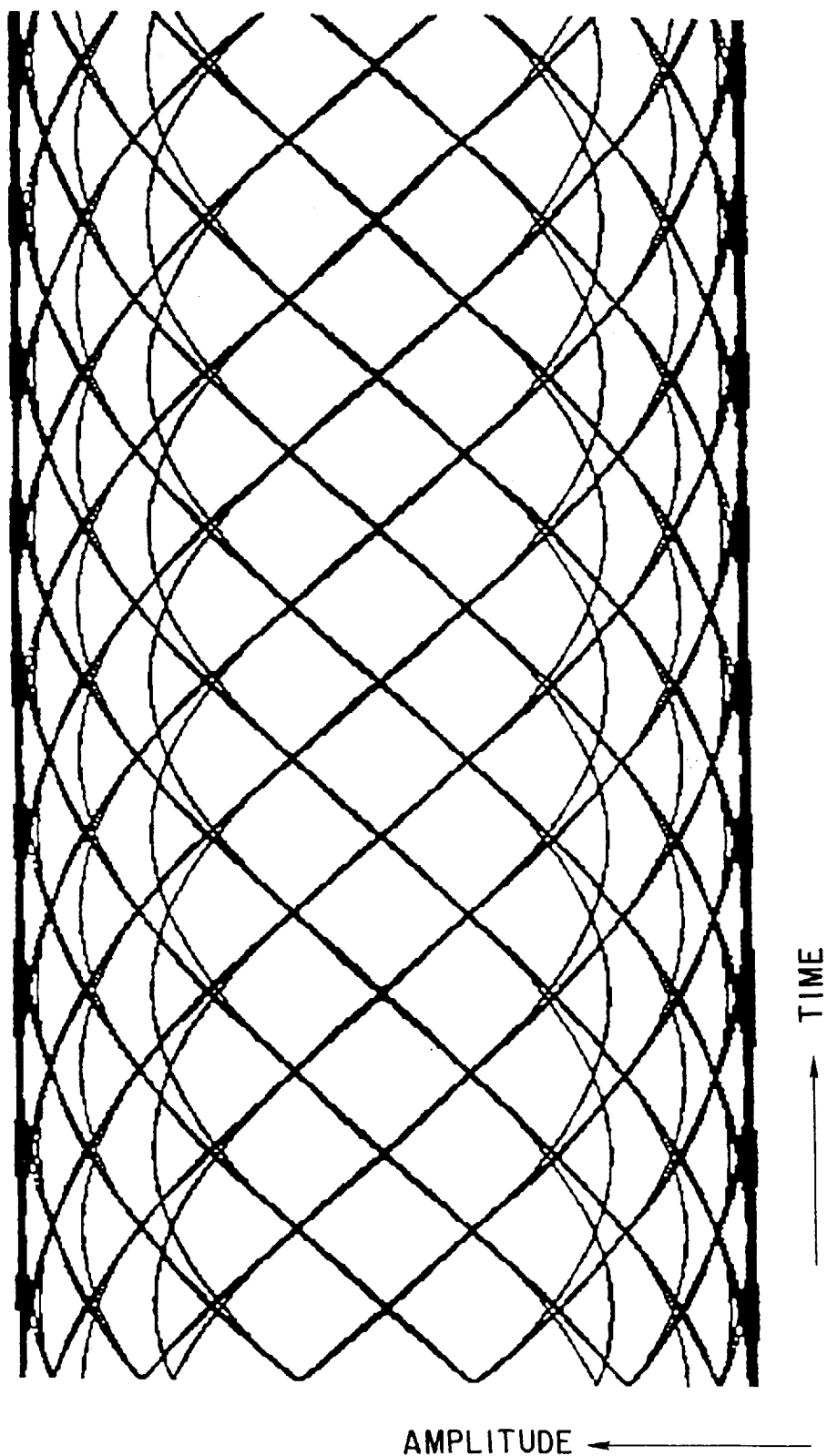
FIG. 10 shows eye pattern characteristics of an output signal from a G(fs) converter shown in FIG. 8.

In a first step, G(fs) frequency characteristics are provided to the input bit sequence and a signal with eye pattern characteristics shown in FIG. 10 is produced. Suppose that the signal shown in FIG. 10 has been amplified at a saturated level. Obtaining a saturation-amplified output involves amplifying the signal shown in FIG. 10 in the amplitude direction, slicing the positive-side and negative-side levels and extracting intermediate portion in the amplitude direction.

Figure 11:
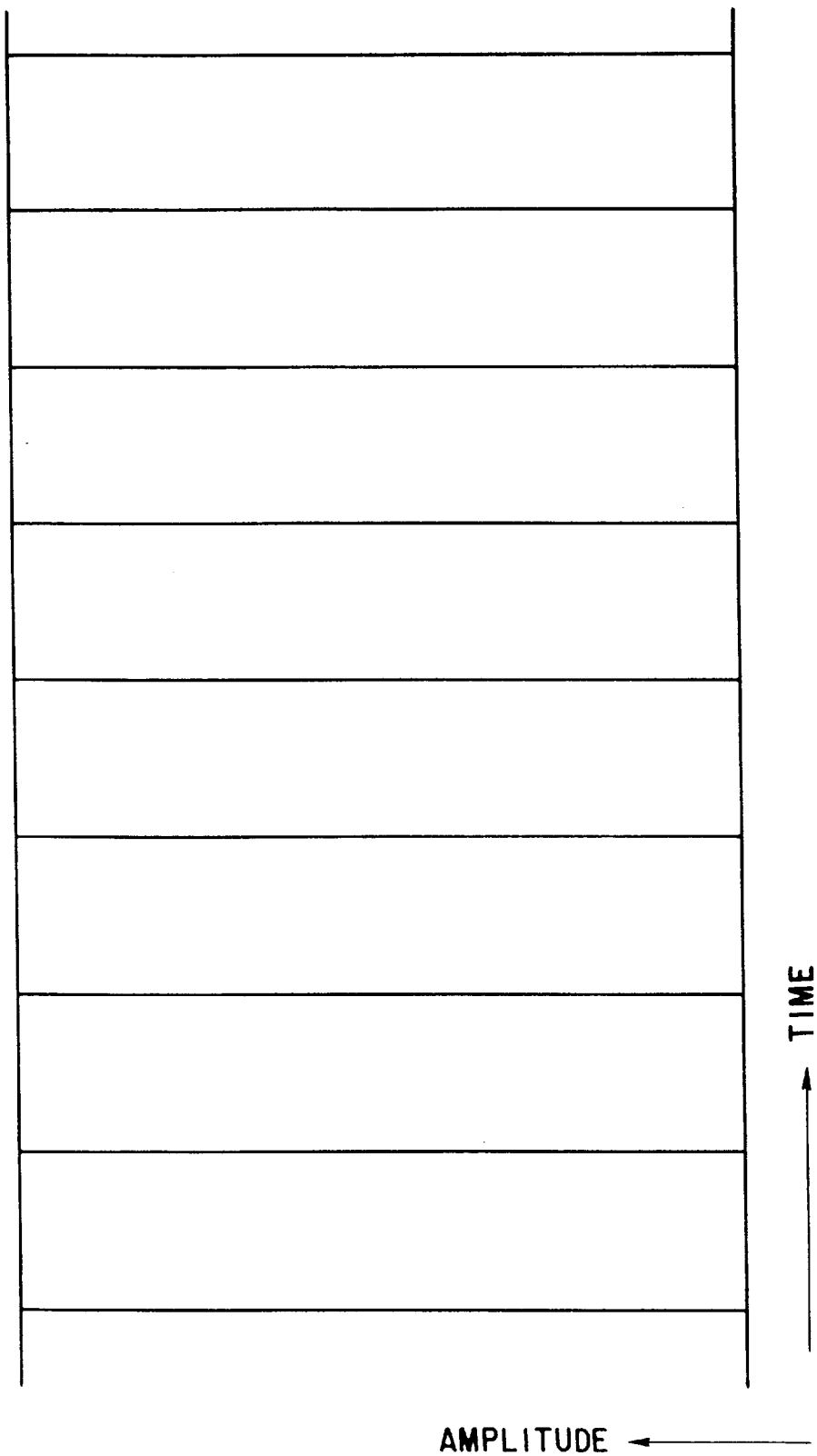
FIG. 11 shows a signal waveform in the case where a signal with characteristics shown in FIG. 10 has been amplified at a saturated level.

Then, characteristics as shown in FIG. 11 are obtained.

If the obtained bit sequence signal is recorded on the optical disk, the recorded signal is the same as in the case of EQ(fs)=1 (no recording equalization). Specifically, when the G(fs) frequency characteristics have just been provided to the input bit sequence, the recording frequency characteristics are flat.

Figure 12:
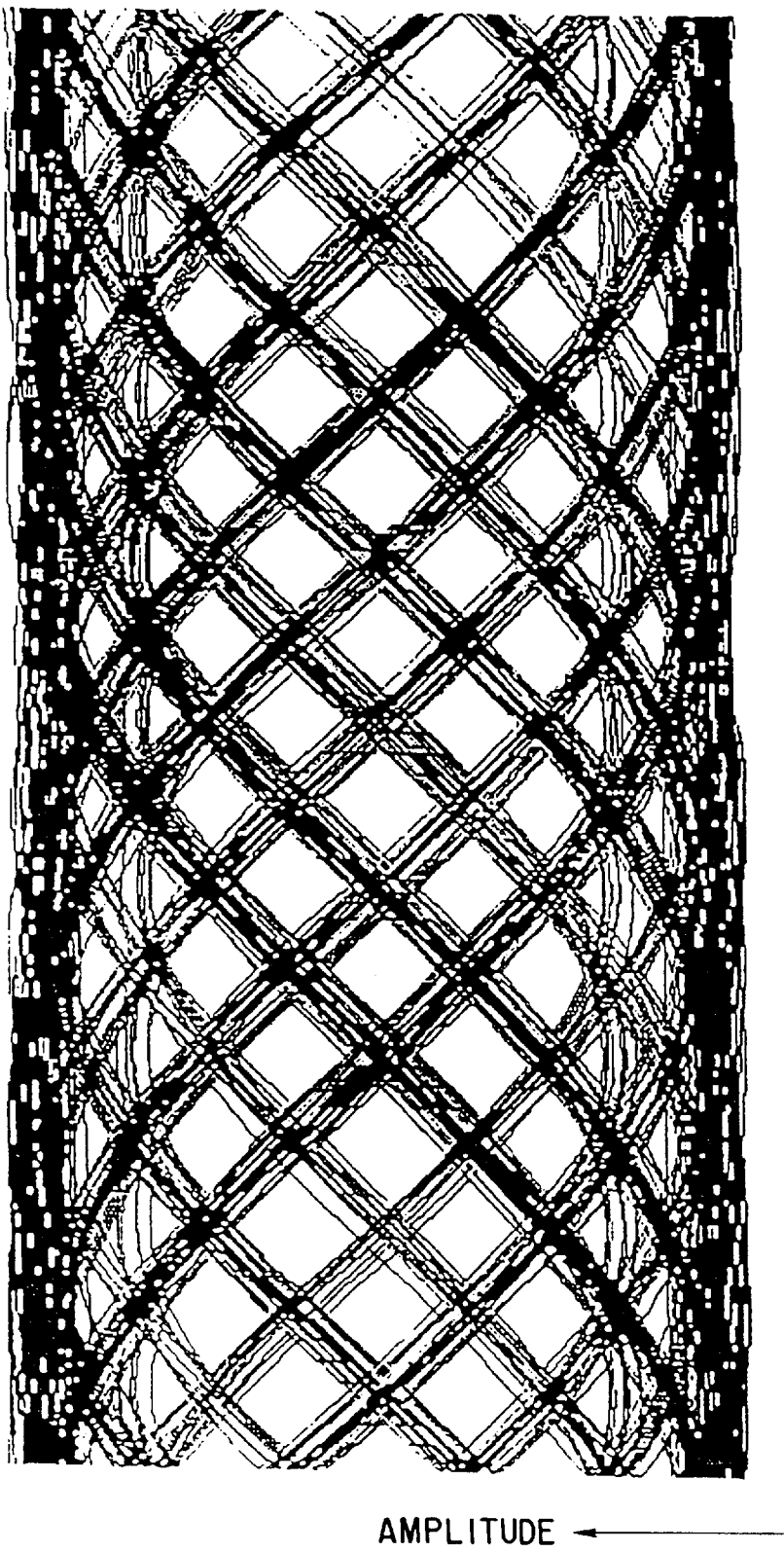
FIG. 12 shows eye pattern characteristics of a signal obtained after providing the signal having characteristics shown in FIG. 10 with equalized frequency characteristics EQ(fs)

On the other hand, in the present system, in a second step following the first step, the equalizing frequency characteristics EQ(fs) expressed by equation (1) are provided to the signal with the characteristics shown in FIG. 10. Thus, a recording equalizing signal with enhanced high-frequency characteristics, as shown in FIG. 12, is produced.

Figure 13:
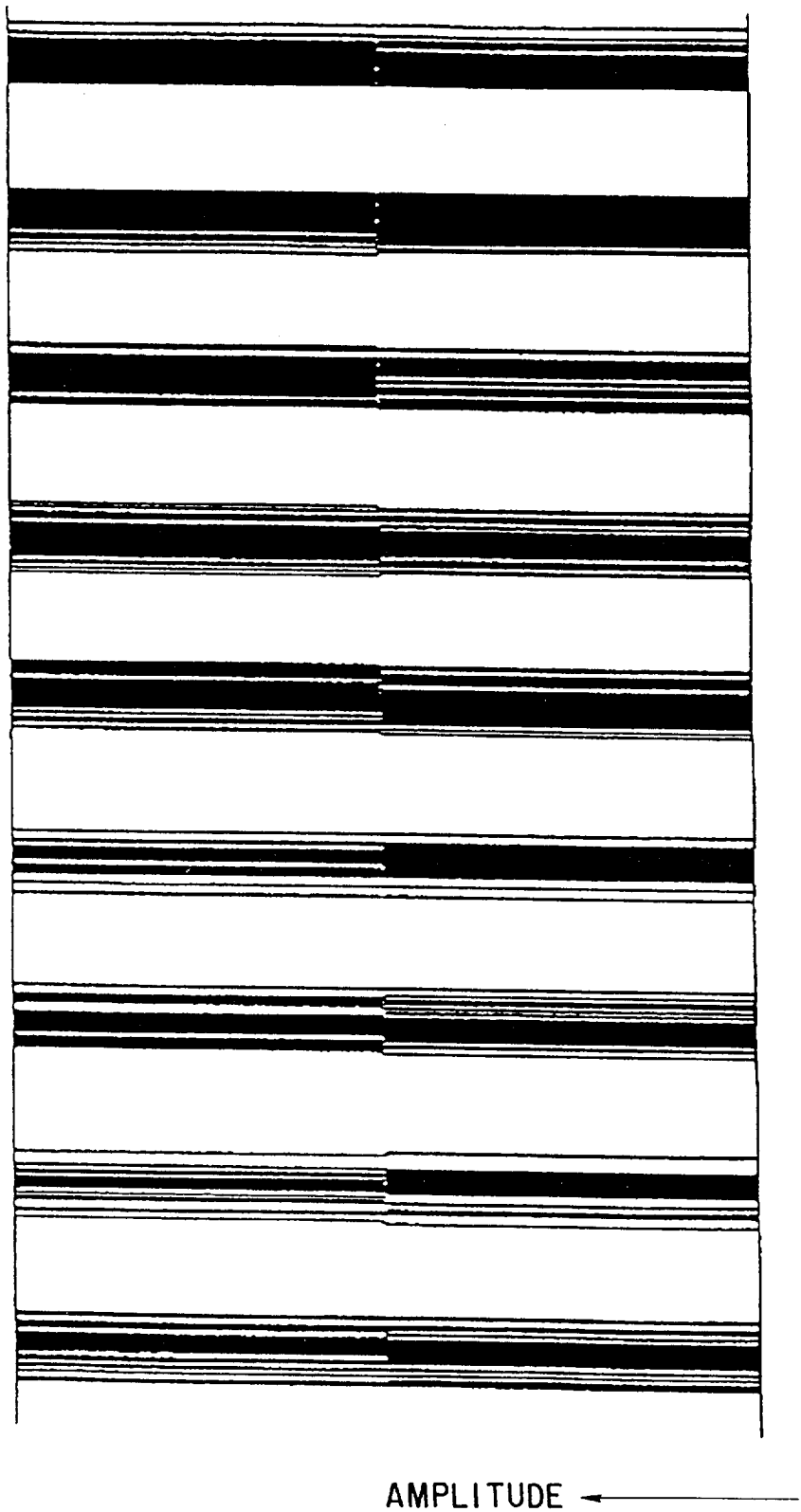
FIG. 13 shows a signal waveform of a signal with characteristics shown in FIG. 12, which has been amplified at a saturated level, i.e. a waveform of an output signal from a saturating amplifier shown in FIG. 7.

If this recording equalizing signal is saturation-amplified, a signal waveform including jitter in the time-axis direction, as shown in FIG. 13, is obtained. Specifically, a signal in which jitter is intentionally included is produced, and this signal is used for recording.

If the obtained bit sequence signal is recorded on the optical disk, the time-axis jitter included in the bit sequence signal influences the recording pit length on the optical disk. Consequently, the recording pit sequence is provided with equalizing frequency characteristics.

Figure 14:
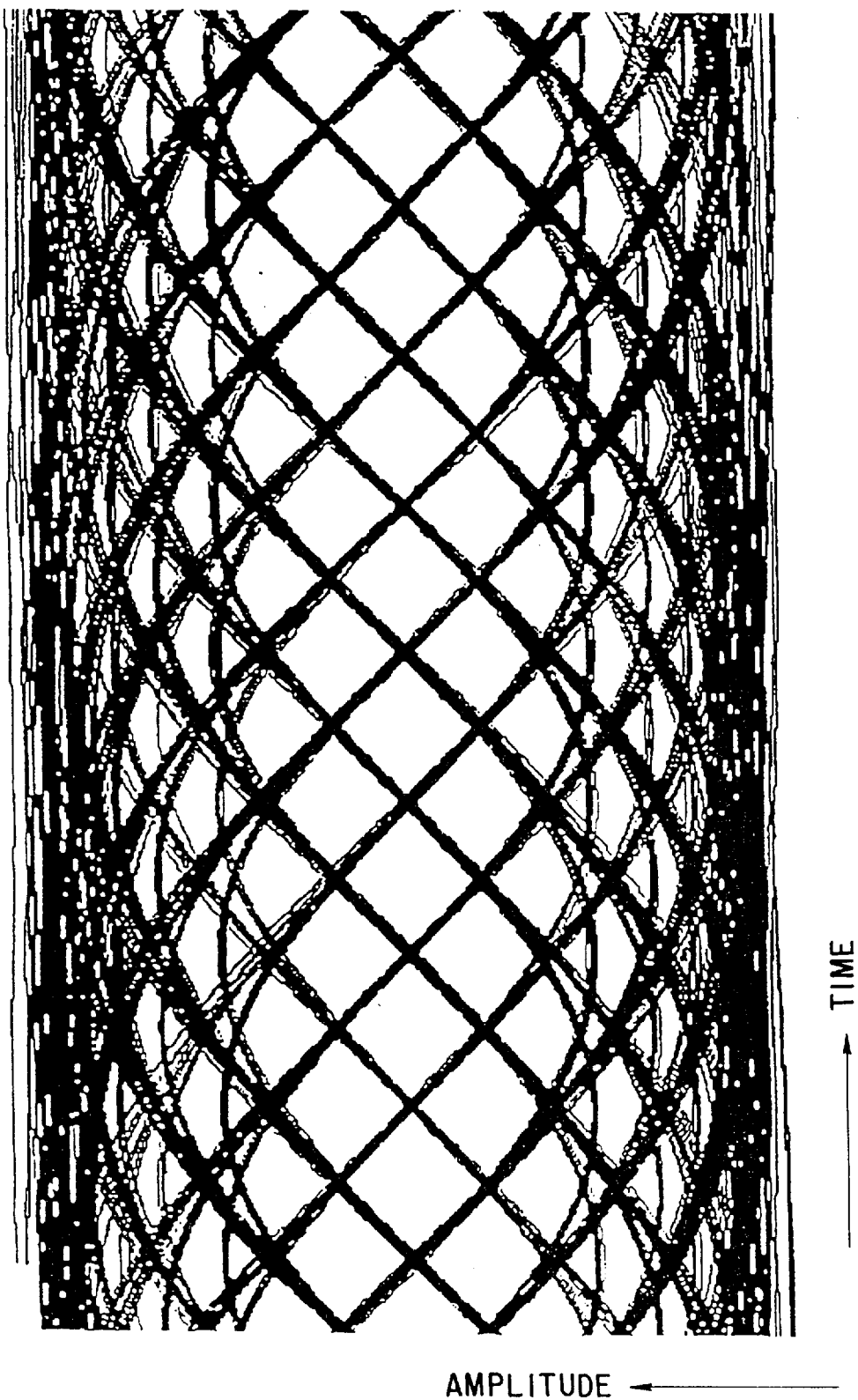
FIG. 14 shows eye pattern characteristics of an output signal obtained by reading information on the optical disk shown in FIG. 7 by means of the pickup.

If the optical disk on which the pit sequence provided with the above-described equalizing frequency characteristics has been recorded is reproduced, an excellent signal waveform with less jitter can be obtained as output signal of the optical pickup, irrespective of the relative reading speed V, as shown in FIG. 14. Thereby, the equalizer on the reproducing apparatus side can be dispensed with, and the structure of the reproducing apparatus can be simplified. In addition, if the equalizer on the reproducing apparatus side is dispensed with, the cost of the system is reduced. Furthermore, if the equalizer is dispensed with, there is no need to consider certification of characteristics of the equalizer or time-basis degradation of characteristics.

In the present embodiment, the G(fs) converter 31 for providing G(fs) characteristics to the bit sequence signal and the EQ(fs) converter 32 for adding equalizing frequency characteristics of EQ(fs) are separately provided. However, the converters 31 and 32 of this embodiment may be replaced with a single converter for providing characteristics obtained by multiplying G(fs) by EQ(fs).

The reproducing apparatus may be constructed such that a reproducing path including an equalizer 29 and a reproducing path including no equalizer may both be included on the reproducing side. The reproducing path including the equalizer can be effectively used for reproducing a conventional optical disk. The reproducing path having no equalizer is used for reproducing an optical disk on which information with the aforementioned equalizing frequency characteristics is recorded.

In the above embodiment, the present invention is applied to an optical disk recording/reproducing system. However, this invention is applicable to a digital signal recording system for magnetic disks and a recording system for magnetic tapes. In this case, the aforementioned spatial transmission frequency characteristics OTF(fs) are replaced with frequency characteristics of the magnetic head.

Needless to say, this invention is applicable to a digital signal transmission and reception system. In this case, the aforementioned spatial transmission frequency characteristics OTF(fs) are replaced with frequency characteristics between an antenna and an input unit of a high-frequency reception unit.

Figure 15:
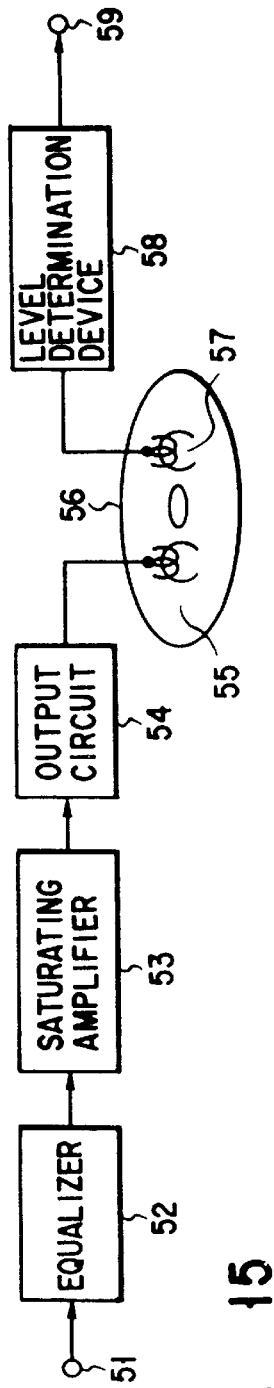
FIG. 15 shows another embodiment of the invention.

FIG. 15 shows a recording system for recording digital data on a magnetic disk 56 and a reproducing system for reproducing digital data from the magnetic disk 56. Digital modulation data is equalized by an equalizer 52 with equalizing characteristics similar to those employed on a conventional reproducing unit. The equalized data is input to a saturating amplifier 53. An output (binary signal) from the saturating amplifier 53 is converted to an electric current in an output circuit 54 and supplied to a magnetic head 55. Thus, a high-frequency component of the rectangular wave is equalized and recorded on the magnetic disk 56. In a reproducing mode, recorded information is read out from the magnetic disk 57. An attenuation component of the read-out signal is already compensated in the recording mode. Thus, the read-out signal is input to a level determination device 58 as it is, and value "0" and value "1" are discriminated to feed a two-value output to an output terminal 59.

Figure 16:
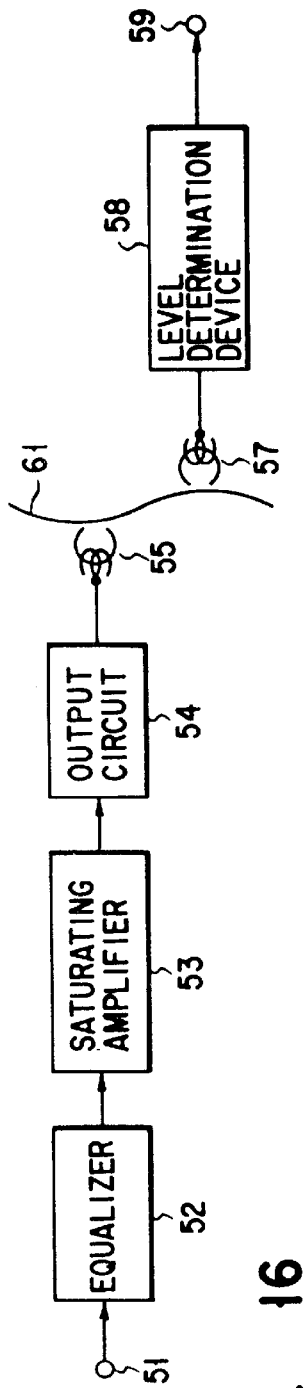
FIG. 16 shows still another embodiment of the invention.

FIG. 16 shows an embodiment wherein the magnetic disk shown in FIG. 15 is replaced with a magnetic tape 61 as recording medium. The other structural elements are common to those shown in FIG. 15 and are denoted by like reference numerals. Description of those common elements is omitted.

Figure 17:
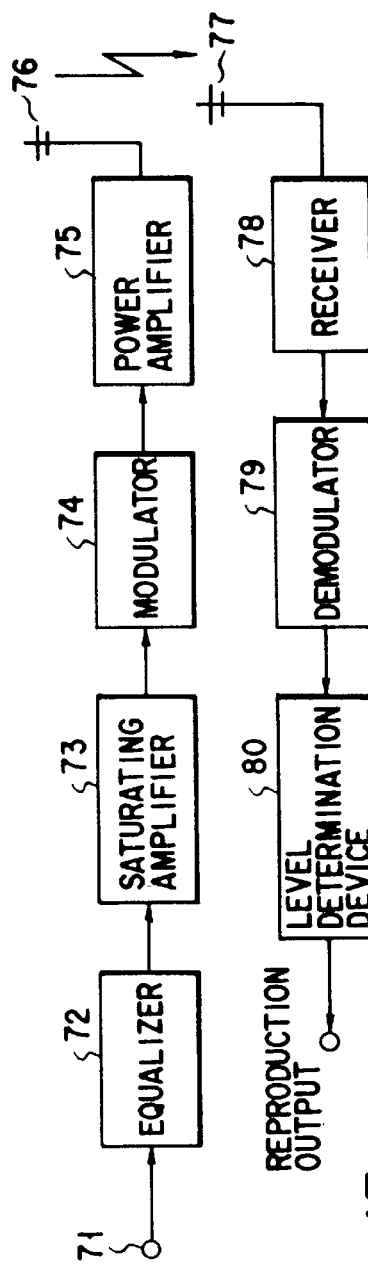
FIG. 17 shows still another embodiment of the invention.

FIG. 17 shows an embodiment wherein the invention is applied to a system for transmitting digital data through a radio medium. Digital modulation data input from an input terminal 71 is equalized by an equalizer 72 with equalizing characteristics which compensate for the reception characteristics on the reception side. The equalized data is input to a saturating amplifier 73. An output (rectangular wave signal) from the saturating amplifier 73 is modulated by a modulator 74 to a transmission signal. The transmission signal is amplified by a power amplifier 75 and fed to an antenna 76. On the reception side, a reception antenna 77 receives the transmitted signal, and the received signal is input to a receiver 78 and then delivered to a demodulator 79. Thus, the signal on the transmission side prior to the modulation is obtained. An output from the demodulator 79 is input to a level determination device 80 and restored to the digital modulation data on the transmission side.

As has been described above, according to the present invention, the recording pit sequence on the disk is provided with the equalizing frequency characteristics of the output signal reproduced by the reproducing optical pickup. Thus, an excellent signal waveform with less jitter can be obtained, irrespective of the relative reading speed V, and the equalizing circuit on the reproducing apparatus side can be dispensed with.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of recording a digital signal, the method comprising:

combining an input bit sequence, which has a bit interval Pw and an interval of n×Pw to m×Pw (n<m; n and m=integers) of transition points between bit 0 and bit 1, with predetermined frequency characteristics, thereby obtaining a first signal retaining information of the interval of the bit transition points;

combining said first signal with equalizing characteristics of an output signal reproduced by a reproducing pickup, thereby producing a second signal including jitters; and saturation-amplifying and second signal and converting the saturation-amplified signal to bit sequence which is a binary signal, thereby obtaining a recording signal, whereby equalization of a reproduced signal is not needed.

2. The method according to claim 1, wherein said recording signal is recorded on a recording medium.

3. An apparatus for recording a digital signal, comprising:

first conversion means for combining an input bit sequence, which has a bit interval Pw and an interval of n×Pw to m×Pw (n<m; n and m=integers) of transition points between bit 0 and bit 1, with predetermined frequency characteristics, thereby obtaining a first signal retaining information of the interval of the bit transition points;

second conversion means for combining said first signal output from said first conversion means with equalizing characteristics of an output signal reproduced by a reproducing pickup, thereby producing a second signal including jitters;

third conversion means for saturation-amplifying said second signal output from said second conversion means and converting the saturation-amplified signal to a bit sequence which is a binary signal, thereby obtaining a recording signal whereby equalization of a reproduced signal is not needed; and recording means for recording the recording signal on a recording medium.

4. The apparatus according to claim 3, wherein said equalizing frequency characteristics are obtained by multiplying said predetermined frequency characteristics by a coefficient of inverse characteristics of optical frequency characteristics of said reproducing optical pickup.

5. The apparatus according to claim 3, wherein said predetermined frequency characteristics are k×100% cosine roll-off characteristics (when $0 \leq k \leq 1$) with a cut-off frequency of $1/(2n \times Pw)$.

6. The apparatus according to claim 3, wherein said recording signal is recorded on a recording medium.

7. A method of transmitting a digital signal, the method comprising:

combining an input bit sequence, which has a bit interval Pw and an interval of n×Pw to m×Pw (n<m; n and m=integers) of transition points between bit 0 and bit 1, with predetermined frequency characteristics, thereby producing a first signal retaining information of the interval of the bit transition points;

combining said first signal with equalizing characteristics of an output signal from a reception-side high-frequency reception unit, thereby producing a second signal including jitters; and saturation-amplifying said second signal and converting the saturation-amplified signal to a bit sequence which is a binary signal, thereby obtaining a transmission signal, whereby equalization of a reproduced signal is not needed.

8. An apparatus for transmitting a digital signal, comprising:

first means for combining an input bit sequence, which has a bit interval Pw and an interval of n×Pw to m×Pw (n<m; and n and m=integers) of transition points between bit 0 and bit 1, with predetermined frequency characteristics, thereby obtaining a first signal retaining information of the interval of the bit transition points;

second means for combining said first signal output with equalizing characteristics of an output signal from a reception-side high-frequency reception unit, thereby producing a second signal including jitters; and third means for saturation-amplifying said second signal and converting the saturation-amplified signal to a bit sequence which is a binary signal, thereby obtaining a transmission signal, whereby equalization of a reproduced signal is not needed.

* * * * *